US 7,885,216 B2

(12) United States Patent
Voyer et al.

(10) Patent No.: US 7,885,216 B2
(45) Date of Patent: Feb. 8, 2011

(54) METHOD AND DEVICE FOR SETTING UP THE TRANSFER OF A MULTIMEDIA CONTENT IN A CELL OF A WIRELESS CELLULAR TELECOMMUNICATION NETWORK

(75) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 777 days.

(21) Appl. No.: 11/839,182

(22) Filed: Aug. 15, 2007

(65) Prior Publication Data

US 2008/0049663 A1    Feb. 28, 2008

(30) Foreign Application Priority Data

Aug. 22, 2006    (EP)    ................... 06017471

(51) Int. Cl.
*H04B 7/00* (2006.01)
(52) U.S. Cl. .................... 370/310.2; 370/328
(58) Field of Classification Search .............. 370/310.2, 370/312, 328, 329, 331, 332, 338, 341, 349; 455/446, 440
See application file for complete search history.

(56) References Cited

U.S. PATENT DOCUMENTS

| 5,613,198 | A | * | 3/1997 | Ahmadi et al. ............. 370/337 |
| 2004/0008646 | A1 | | 1/2004 | Park et al. |
| 2004/0235478 | A1 | * | 11/2004 | Lindquist et al. ........... 455/440 |
| 2005/0048980 | A1 | * | 3/2005 | Kumar et al. .............. 455/443 |
| 2005/0096055 | A1 | | 5/2005 | Colban et al. |

* cited by examiner

*Primary Examiner*—Brenda Pham
(74) *Attorney, Agent, or Firm*—Oblon, Spivak, McClelland, Maier & Neustadt, L.L.P.

(57) ABSTRACT

The invention concerns a method and a device for setting up the transfer of a multimedia content in a cell of a wireless cellular telecommunication network constituted of plural cells, the cells being neighbour of at least one other cell, each cell being managed by a base station. A first base station which manages a first cell receives from a second base station which manages a second cell which is neighbor of the first cell managed by the first base station, a message notifying that the second base station transfers the multimedia content in the second cell, the message comprising at least information identifying the multimedia content. The first base station obtains the multimedia content from the wireless cellular telecommunication network and transfers the multimedia content in the first cell.

11 Claims, 7 Drawing Sheets

METHOD AND DEVICE FOR SETTING UP THE TRANSFER OF A MULTIMEDIA CONTENT IN A CELL OF A WIRELESS CELLULAR TELECOMMUNICATION NETWORK

The present invention relates to a method and a device for setting up a multicast or broadcast transmission, which may be used, e.g. for a Multicast Broadcast Multimedia Service (MBMS) architecture.

MBMS is a broadcasting service that can be offered via cellular networks. MBMS uses multicast distribution in the core network instead of point-to-point links for each end device. The MBMS feature is split into the MBMS Bearer Service and the MBMS User Service. The MBMS Bearer Service includes a Multicast and a Broadcast Mode. The MBMS Bearer Service uses IP Multicast addresses for the IP flows.

Broadcast and Multicast are methods for transmitting data from a single source to several destinations, i.e., point-to-multipoint transmissions.

In such broadcasting service, two possibilities are offered.

A first possibility consists in that each base station of the wireless cellular telecommunication network transfers the multimedia content in the cell it manages in order to ensure that every mobile terminal can get the multimedia content without any trouble even if some handover between cells managed by the base stations occur.

Such solution is not satisfactory because the multimedia content is transferred into cells wherein no mobile terminal are interested or may be interested by such multimedia content. As a result, unnecessary transmission of radio signals is done. These radio signals generate some interferences for the other services provided by the wireless cellular telecommunication network and occupy a bandwidth which could be used for other services in those cells.

A second possibility consists in that only the base stations of the wireless cellular telecommunication network which serve a mobile terminal requesting the multimedia content, transfer the multimedia content in their respective cell.

When a mobile terminal moves away from a cell and enters in a target cell, the mobile terminal executes a handover procedure with the target cell. If the MBMS service is not active in the target cell, until handover is made and the MBMS service is made ready in the target cell, the received multimedia content quality can be significantly reduced, creating potential coverage issue and rupture or degradation of service at the edge of the target cell.

That solution is not satisfactory also due to above mentioned problems.

In the new generation of cellular wireless network, like the Long Term Evolution (LTE) network, MBMS is considered to be implemented.

LTE uses Orthogonal frequency-division multiplexing (OFDM) transmission.

In LTE, the concept of Single Frequency Networks (SFN) transmission is used. SFN transmission over adjacent cells extends the quality of the reception of multimedia content at the edge of the cell. SFN transmission consists in transmitting exactly the same OFDM signal at two adjacent base stations, so that the mobile receiver, located at the edge of cells of the two base stations, sees a superimposed signal, with higher average power than if it was received from only one of the base stations. Thanks to OFDM modulation, the superposition of received signals adds in received power and creates no Inter-Symbol Interference (ISI) as long as the time offset between the two received signals is lower than a given parameter, the so-called OFDM guard interval. The replica of the signals would then be treated as additional multipath, feature that is very desirable for OFDM, as it brings more power and diversity.

To make sure that the above constraint is met, the two based stations need to be aligned in their transmission interval or in other words need to be synchronised, i.e. use a shared time reference, coordinate the usage of time and have the same scheduling/treatment of MBMS packets in base stations.

The synchronising of a whole wireless cellular network is difficult. Solutions like GPS receivers used for synchronisation or network based synchronisation are not satisfactory. GPS receivers need to be in line of sight of multiple satellites, IP-based networks bring some delays and unpredictable latencies.

In the third generation of wireless cellular networks, the base stations are assumed to be not synchronised. A data flow can reach a mobile terminal via multiple non synchronised base stations and is aligned at reception by the mobile terminal within a predetermined time window. This is necessary and happens when the mobile terminal is in macro-diversity mode classically named soft handover.

In such case, at the time of establishing a new radio link via a new base station, the mobile terminal measures the time offset between the reference time signal transmitted by the base station which serves the mobile terminal and the reference time signal transmitted by the candidate base station.

This measurement is reported to a Radio Network Controller (RNC) which controls the base stations. The RNC orders the base station which manages the candidate cell to align the data packets of the multimedia content with the reference time according to that offset. To that end, each data packet sent from the RNC to the base stations is marked with a timing information named Connection Frame Number (CFN).

Such technique is adapted for point to point transmission and not for point to multipoint as far as if two mobile terminals currently served by different base stations select the same new base station, the timing information may be different. It becomes then difficult to keep a received multimedia content quality for each mobile terminal.

The aim of the invention is therefore to propose a method and a device which make it possible to provide a MBMS service to mobile terminals even when the mobile terminals moves from one cell to another cell and by avoiding to use inefficiently the resources of the wireless cellular telecommunication network.

To that end, the present invention concerns a method for setting up the transfer of a multimedia content in a cell of a wireless cellular telecommunication network constituted of plural cells, the cells being neighbour of at least one other cell, each cell being managed by a base station, characterised in that the method comprises the steps executed by a first base station which manages a first cell of:

receiving from a second base station which manages a second cell which is neighbour of the first cell managed by the first base station, a message notifying that the second base station transfers the multimedia content in the second cell, the message comprising at least information identifying the multimedia content, obtaining the multimedia content from the wireless cellular telecommunication network, transferring the multimedia content in the first cell.

The present invention concerns also a device for setting up the transfer of a multimedia content in a cell of a wireless cellular telecommunication network constituted of plural cells, the cells being neighbour of at least one other cell, each cell being managed by a base station, characterised in that the device for enabling the transfer of the multimedia content is included in a first base station which manages a first cell and comprises:

means for receiving from a second base station which manages a second cell which is neighbor of the first cell managed by the first base station, a message notifying that the second base station transfers the multimedia content in the second cell, the message comprising at least information identifying the multimedia content, means for obtaining the multimedia content from the wireless cellular telecommunication network, means for transferring the multimedia content in the first cell.

Thus, if a mobile terminal located in the second cell receives the multimedia content and executes an handover from the second cell to the first cell, the mobile terminal will be able to receive the multimedia content without any quality loss during the handover procedure.

Furthermore, the resources of the wireless cellular telecommunication network are used efficiently. As far as no mobile terminal requesting the multimedia content are located in the vicinity of the first cell, the multimedia content is not transferred in the first cell.

According to a particular feature, the first base station:

receives from a mobile terminal served by the first base station a message informing that the mobile terminal expects to receive the multimedia content in the first cell, transfers a message to at least a third base station which manages a third cell which is neighbour from the first cell, the message notifying that the first base station transfers the multimedia content in the first cell and the message comprising at least information identifying the multimedia content.

Thus, the third base station is informed that the first base station transfers the multimedia content in the first cell only when a mobile terminal requesting the multimedia content is located in the first cell. By doing so, the present invention avoids that unnecessary propagations of the transfer of the multimedia content are made between base stations managing neighbour cells. The notification is done only if the transfer of the multimedia content in the first cell is justified by the fact that a mobile terminal requests the multimedia content in the first cell.

According to a particular feature, the first base station:

monitors the number of mobile terminals which receive the multimedia content in the first cell, transfers a message to at least the third base station notifying that no mobile terminal receive the multimedia content in the first cell if no mobile terminal receive the multimedia content in the first cell.

Thus, the third base station is informed when no mobile terminal located in the first cell need the multimedia content.

According to a particular feature, the first base station:

monitors the number of base stations which manage neighbouring cells of the first cell and which transfer the multimedia content in the cell they respectively manage.

stops to transfer the multimedia content in the first cell if no base stations which manage neighbouring cells of the first cell transfer the multimedia content in the cell they respectively manage and if no mobile terminal receive the multimedia content in the first cell, transfers a message to at least the third base station notifying that the first base station stops to transfer the multimedia content in the first cell.

Thus, the resources of the wireless cellular telecommunication network are used efficiently. As far as no mobile terminal requesting the multimedia content are located in the vicinity of the first cell, the multimedia content is not transferred in the first cell.

According to a particular feature, the base stations transfer predetermined signal in the cell the base stations respectively manage, the mobile terminals transfer a report of the differences on reception time of the predetermined signals to the base stations.

Thus, the base stations are informed about possible synchronisation problems which may occur on the mobile terminal side.

According to a particular feature, the multimedia content is transferred under the form of time stamped packets and the first base station:

receives from the second base station, information enabling the synchronisation of the transmission of the multimedia content by the first base station with the transmission of the multimedia content by the second base station, transfers the packets in the first cell according to the information enabling the synchronisation of the transmission of the multimedia content by the first base station with the transmission of the multimedia content by the second base station.

Thus, the reception of the multimedia content transferred by the first and second base stations is synchronized. The same signal is transferred at two adjacent base stations, so that the mobile receiver, located at the edge of cells of the two base stations, sees a superimposed signal, with higher average power than if it was received from only one of the base stations. Such characteristic is particularly effective when OFDM technique is used in the wireless cellular telecommunication network.

Furthermore, that characteristic can be realised without synchronising the base stations together with a common clock reference, such as GPS. Base stations can easily be deployed indoor.

According to a particular feature, the first base station:

receives from the second base station information describing the radio resources which correspond to the multimedia content, allocates the radio resources according to the information describing the radio resources.

Thus, the first base station uses the same radio resources as the second base station.

According to a particular feature, the message notifying that the second base station transfers the multimedia content in the second cell further comprises a multicast address used by the second base station for receiving the multimedia content and once the message notifying that the second base station transfers the multimedia content in the second cell is received, the first base station checks if the multimedia content is transferred in the first cell, and if the multimedia content is transferred in the first cell, the first base station checks if the multicast address comprised in the message notifying that the second base station transfers the multimedia content in the second cell is different from a multicast address used by the first base station for receiving the multimedia content and transfers a message to the other base stations which use the same multicast address used by the first base station for receiving the multimedia content or to the base stations which use the same multicast address used by the second base station for receiving the multimedia content.

Thus, the base stations which use the same multicast address for receiving the multimedia content used by the first or the second base station are informed that other base stations which transfer the multimedia content use different address for receiving the multimedia content. Using that information it is then possible to be aware of the existence of intersection of areas composed on multiple cells in which the multimedia content is transferred.

According to a particular feature, the message notifying that the second base station transfers the multimedia content in the second cell further comprises information enabling the synchronisation of the first base station and the message transferred to the other base stations which use the same multicast address used by the first base station or to the base stations which use the same multicast address used by the second base station comprises an information representative or a time delay to be applied on the packets of the multimedia content transferred in the cells.

Thus, if an intersection of areas composed on multiple cells in which the multimedia content is transferred appears, it is then possible to synchronise the transfer of the multimedia content in each cell of each area.

According to a particular feature, the multimedia content is transferred under the form of time stamped packets and the message transferred to the other base stations which use the same multicast address used by the first base station for receiving the multimedia content or to the base stations which use the same multicast address as used by the second base station for receiving the multimedia content further comprises an information indicating the value of a timestamp from which the time delay has to be applied on the packets of the multimedia content transferred in the cells.

Thus, the transmission times of the multimedia content will be the same for each pair of neighbouring base stations, within the accuracy offered by the OFDM guard interval.

According to still another aspect, the present invention concerns also a signal transferred to a first base station which manages a first cell of a wireless cellular telecommunication network constituted of plural cells by a second base station which manages a second cell of the wireless cellular telecommunication network, characterised in that the signal comprises an information which indicates that the second base station transfers the multimedia content in the second cell, and the signal comprises at least information identifying the multimedia content.

According to still another aspect, the present invention concerns also a signal transferred to a first base station which manages a first cell of a wireless cellular telecommunication network constituted of plural cells by a second base station which manages a second cell of the wireless cellular telecommunication network, characterised in that the signal comprises an information which indicates that the second base station stops to transfers the multimedia content in the second cell.

Since the features and advantages relating to the signals are the same as those set out above related to the method and device according to the invention, they will not be repeated here.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer program are the same as those set out above related to the method and device according to the invention, they will not be repeated here.

The characteristics of the invention will emerge more clearly from a reading of the following description of an example embodiment, the said description being produced with reference to the accompanying drawings, among which:

Figure 1:
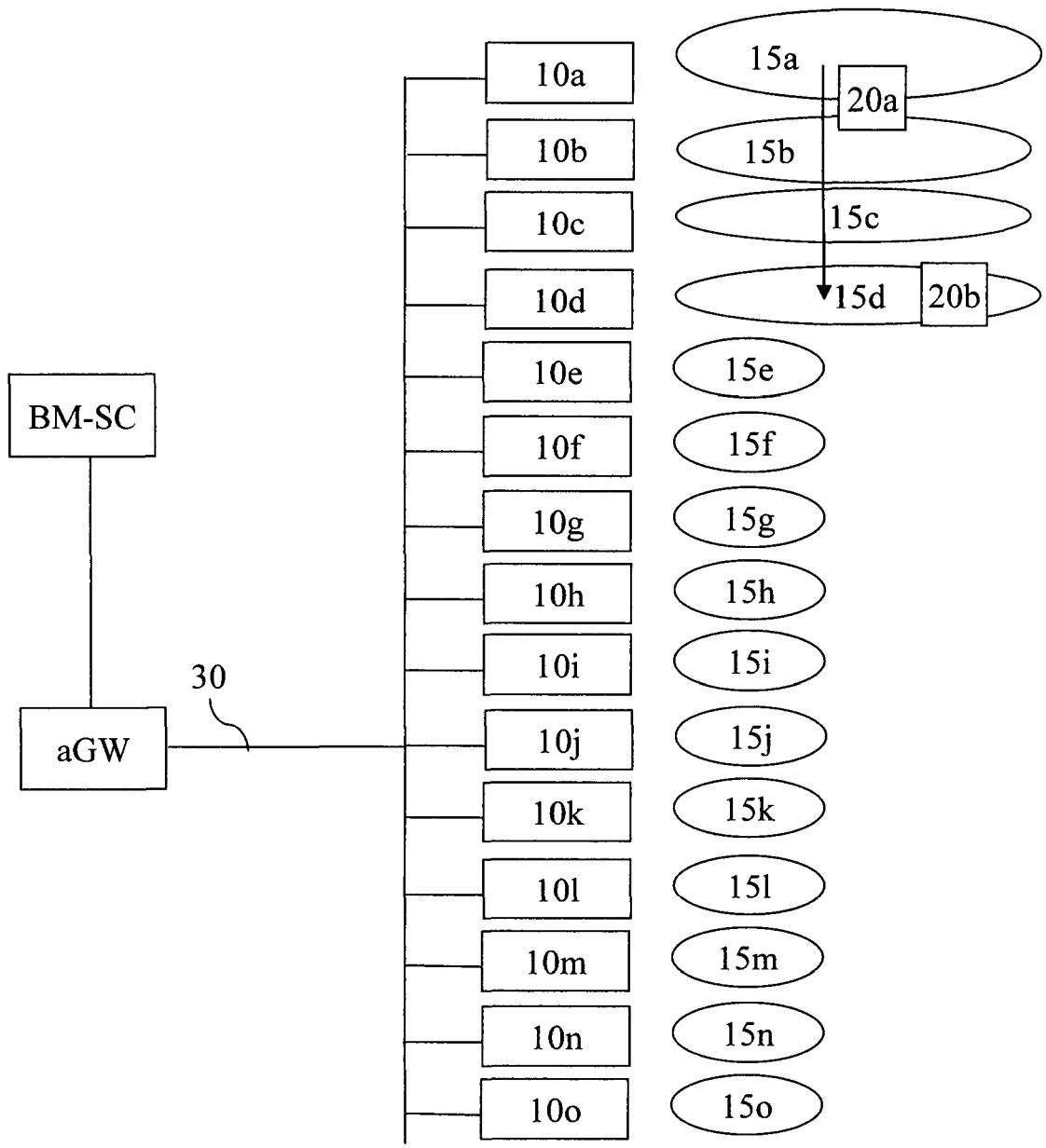
FIG. 1 is a diagram representing the architecture of a wireless cellular telecommunication network according to the present invention.

In the wireless cellular telecommunication network, an Access Gateway aGW is connected to a plurality of bases stations 10a to 10o through a telecommunication network 30.

A base station 10 is also named a Node B or an Enhanced Node B or an access point.

The telecommunication network 30 is a dedicated wired network or a public network like a public switched network or an IP based network or a wireless network or a combination of above cited networks.

The telecommunication network 30 connects the base stations 10 together and permits the transfer of messages and of information between the base stations 10 according to the present invention.

The telecommunication network 30 is capable of multicast. A network node, such as aGW or a base station 10, can request to the telecommunication network 30, as example to an IP router of the telecommunication network 30, to join a given multicast group, with a given multicast address.

The multicast group lists the base stations 10 which transfer the multimedia content corresponding to the multicast address.

It has to be noted here that, plural multicast groups for the same MBMS service can exist in the wireless cellular telecommunication network.

When a node of the telecommunication network 30 (e.g. a base station 10 or Access Gateway aGW) sends a message to a given multicast group with such multicast address, the telecommunication network 30 forwards the message to each base station 10 listed in that multicast group.

The Access Gateway aGW comprises a User Plane Entity (UPE) and a Mobility Management Entity (MME).

The MME assumes the signalling with the base stations 10, the mobile terminals 20, and a Broadcast Multicast Service Centre (BM-SC). The MME configures the UPE when a data flow need to be established, with a unique multicast address per MBMS service, i.e. per multimedia content. MME also delivers that multicast address to the base stations 10 which request to be registered to that MBMS service.

For the purpose of load sharing, redundancy, the MME can associate more than one multicast group to a given MBMS service.

In a variant of realisation, the mapping between MBMS service identifiers and multicast addresses is known in advance by the base station 10, prior to the registration to any MBMS service by said base stations 10.

The UPE forwards the multimedia content of the MBMS service to the base stations 10 via the telecommunication network 30. In case of an MBMS service, the UPE forwards the multimedia content to the telecommunication network 30 with the multicast address indicated by MME at the establishment of MBMS data flow. Each packet delivered by the UPE is time-stamped according to observation of the UPE clock.

The Access Gateway aGW is linked to the DM-SC. The BM-SC controls the delivery of the multimedia content and delivers the multimedia content corresponding to the MBMS service to the UPE.

A mobile terminal 20 also named a user equipment and is as example a mobile phone, a personal computer or a Personal Digital Assistant.

Each base station 10 is able to transfer and or receive data through a wireless area 15. Such area will be called hereinafter a cell 15.

Two base stations 10 are neighbours if their respective cells 15 are located in the neighborhood of each other or neighbours on each other or intersect each other.

In the FIG. 1, only fifteen base stations 10a to 10o and their respective cells 15a to 15o are shown, but we can understand that a more important number of base stations 10 and cells 15 are used in the present invention.

A mobile terminal 20 is served by a base station 10, if it can establish a communication through the base station 10 or if it can continue a communication through the base station 10 using a handover procedure.

A handover procedure occurs when a mobile terminal 20 is in communication with another telecommunication device, as example receives a multimedia content, through a given base station 10 and moves to a cell 15 of a neighbouring base station 10. During the handover procedure, the given base station 10 has to stop to serve the mobile terminal 20 and the neighbouring base station 10 has to start to serve the mobile terminal 20 enabling the continuation of the communication. During a soft handover procedure, the neighbouring base station 10 has to start to serve the mobile terminal 20, while the given base station 10 keeps serving the mobile terminal 20, enabling macro-diversity, the simultaneous continuation of the communication over multiple cells 15.

In the FIG. 1, the mobile terminal 20a is served by the base station 10a and the mobile terminal 20b is served by the base station 10d.

The mobile terminal 20a is moving from the cell 15a of the base station 10a through the cell 15b of the base station 10b, through the cell 15c of the base station 10c and eventually to the cell 15d of the base station 10d.

One can understand that a larger amount of mobile terminals 20 are served by the base stations 20, only two mobile terminals 20 are shown for the sake of simplicity.

Figure 2:
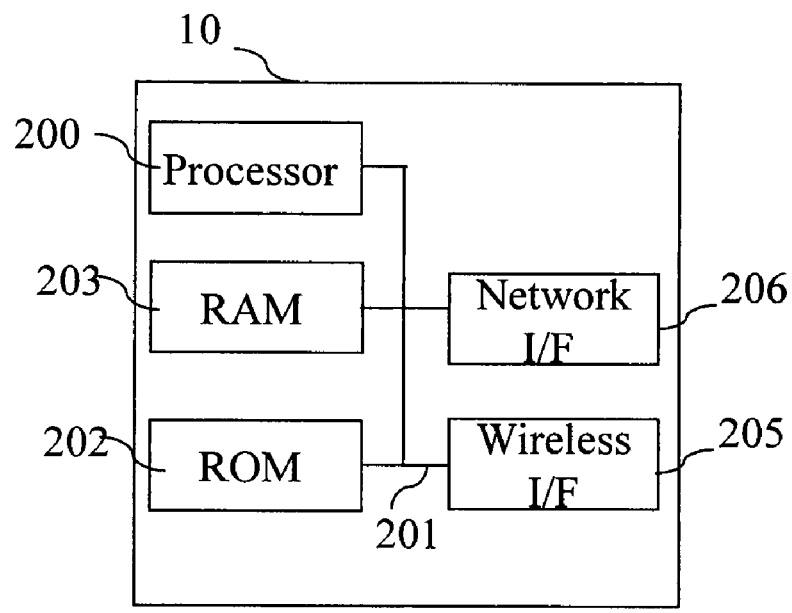
FIG. 2 is a block diagram of a base station according to the present invention.

FIG. 2 is a block diagram of a base station according to the present invention.

The base station 10 has, for example, an architecture based on components connected together by a bus 201 and a processor 200 controlled by programs as disclosed in the FIGS. 4 and 5.

The bus 201 links the processor 200 to a read only memory ROM 202, a random access memory RAM 203, a network interface 206 and a wireless interface 205.

The memory 203 contains registers intended to receive variables and the instructions of the programs related to the algorithms as disclosed in the FIGS. 4 and 5.

The processor 200 controls the operation of the network interface 206 and the wireless interface 205.

The read only memory 202, contains instructions of the programs related to the algorithms as disclosed in the FIGS. 4 and 5 which are transferred, when the base station 10 is powered on to the random access memory 203.

The base station 10 is corrected to the telecommunication network 30 through the network interface 206. As example, the network interface 206 is a DSL (Digital Subscriber Line) modem, or an ISDN (Integrated Services Digital Network) interface, etc. Through such interface, the base station 10 receives multimedia contents related to mobile terminals 20 from the AGW and transfers and/or receives messages from neighbouring base stations 10.

At least one wireless interface 205 permits to communicate with the mobile terminals 20 which are in the cell 15 of the base station 10. The base station 10 can be equipped with more than one wireless interface 205, thus controlling multiple cells 15.

Figure 3:
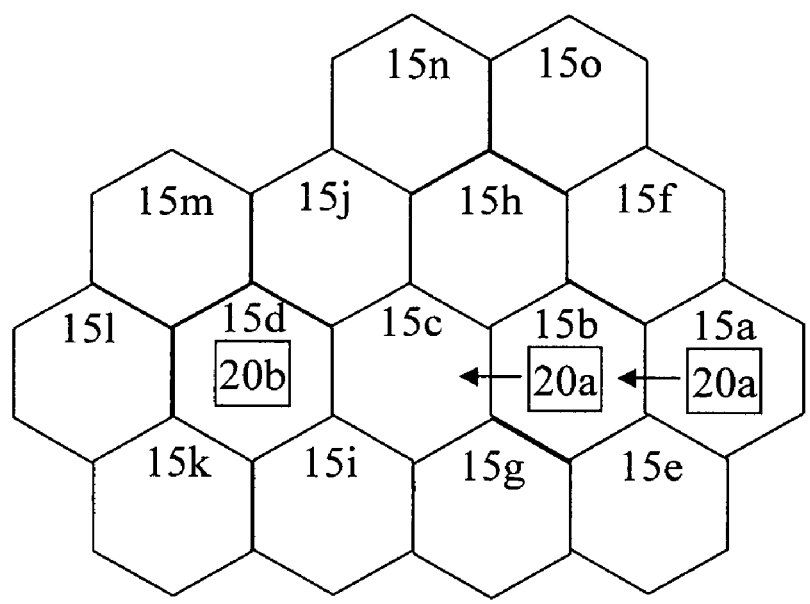
FIG. 3 is a diagram representing the cells of the wireless cellular telecommunication network.

FIG. 3 is a diagram representing the cells of the wireless cellular telecommunication network.

The FIG. 3 is an example of an arrangement of the cells 15 of the base stations 10 showing the neighbouring relationships between the cells 15.

The cell 15a has a plurality of neighbouring cells 15b, 15e and 15f. The cell 15b has a plurality of neighbouring cells 15a, 15c, 15e, 15g, 15h and 15f. The cell 15c has a plurality of neighbouring cells 15b, 15d, 15g, 15l, 15j and 15h. The cell 15d has a plurality of neighbouring cells 15c, 15i, 15k, 15l, 15m and 15j.

The cells 15l and 15k are not neighbours of the cells 15a or 15b or 15c or 15d in the present example but we can understand that they can be considered as neighbours also if the wireless cellular telecommunication network comprises a large amount of cells 15 or if cells 15 are micro cells.

Figure 4A:
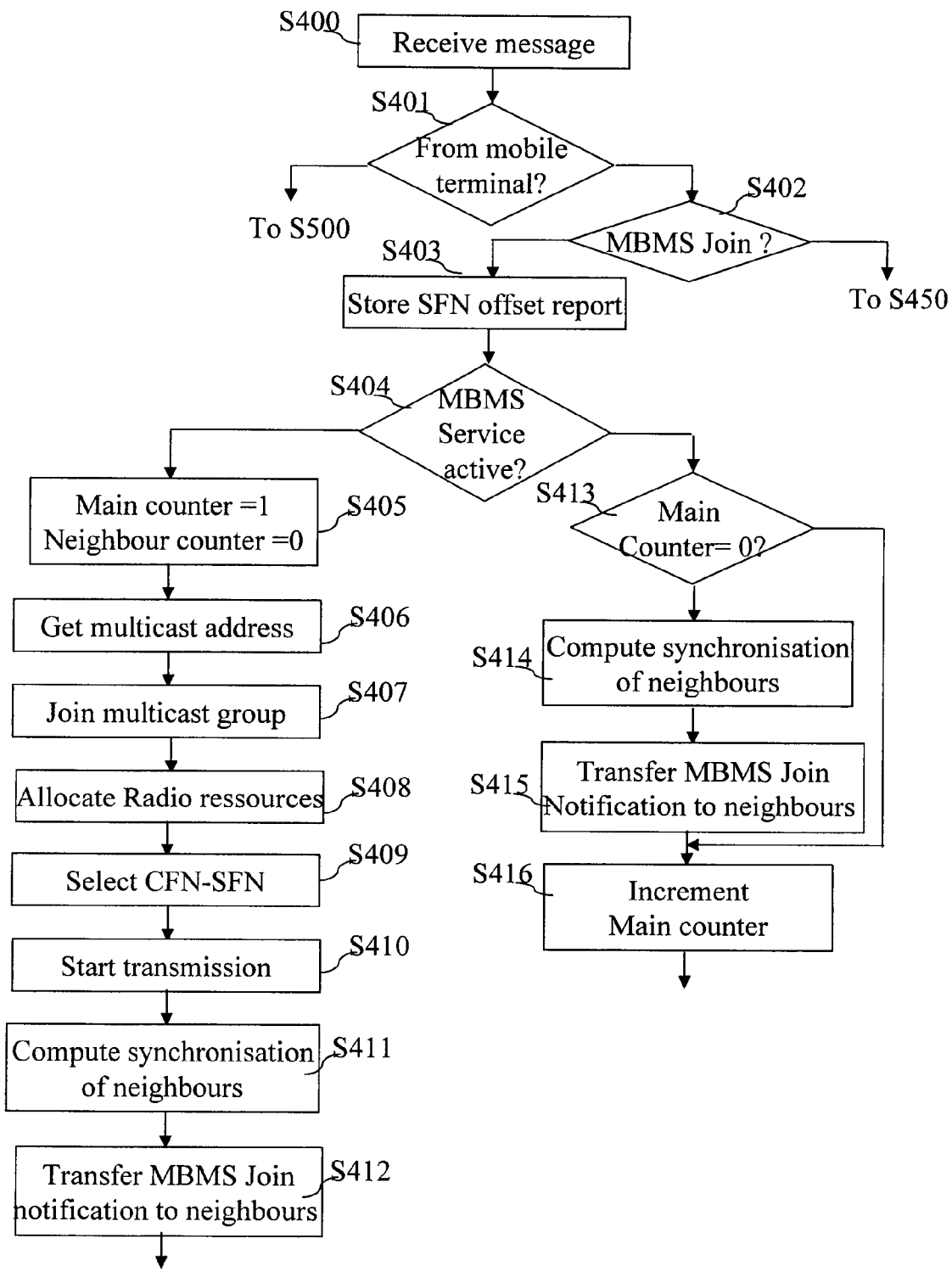
FIGS. 4a and 4b represent an algorithm executed by a base station according to the present invention.
Figure 4B:
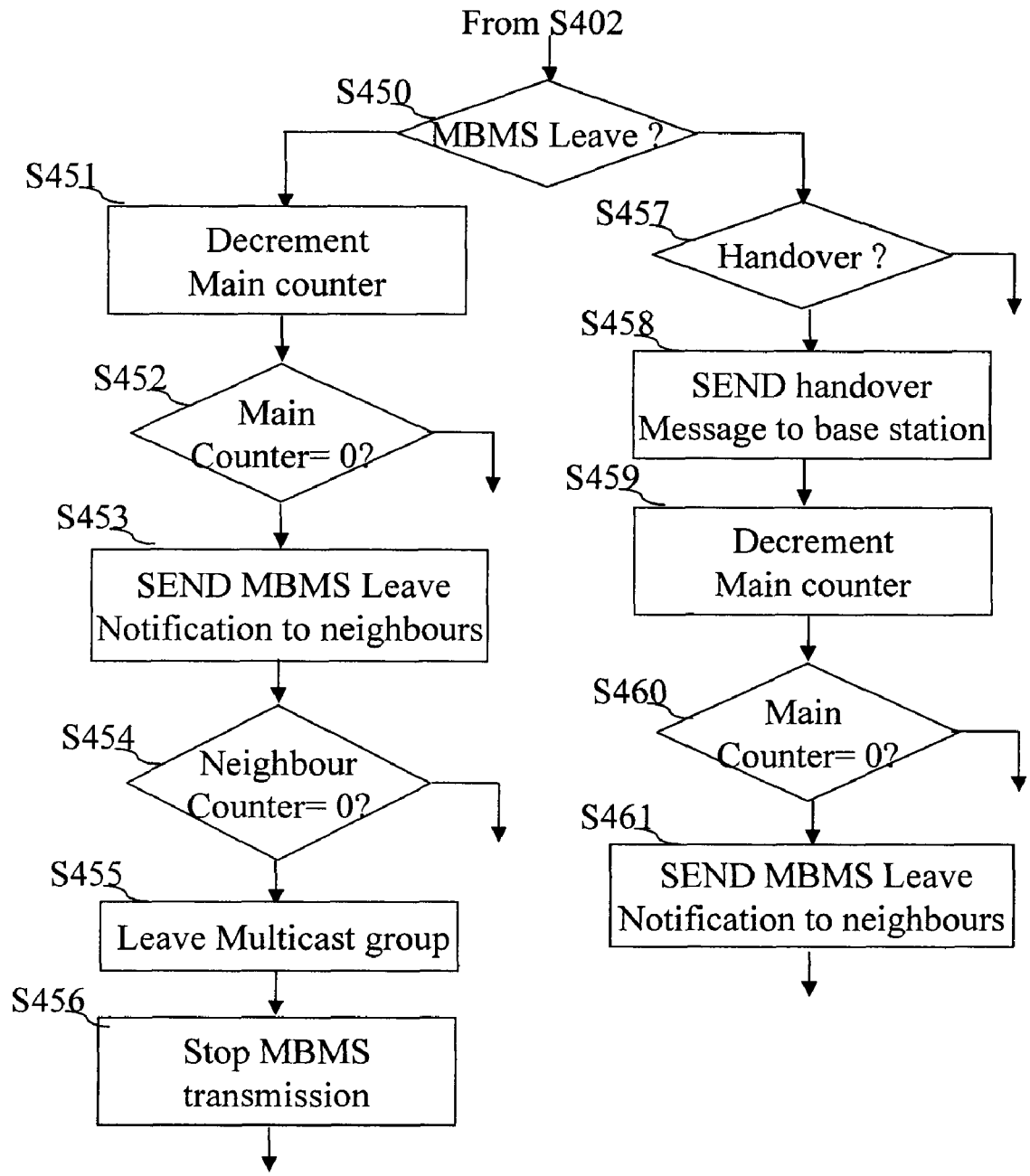

FIGS. 4a and 4b represent an algorithm executed by a base station according to the present invention.

More precisely, the present algorithm is executed by the processor 200 of each base station 10.

Each time a message is received by a base station 10, the processor 200 of that base station 10 executes the present algorithm.

At step S400, the processor 200 detects the reception of a message from the wireless interface 205 or the network interface 206.

At next step S401, the processor 200 checks if the message is received from the wireless interface 205 or from the network interface 206.

If the message is received from the wireless interface 206, it means that the message is sent by a mobile terminal 20 which is located in the cell 15 it manages. The processor moves then to step S402.

If the message is received from the network interface 205, it means that the message is sent by another base station 10. The processor 200 moves then to step S500 of the FIG. 5a.

At step S402, the processor 200 checks if the message is a MBMS join message. If the message is a MBMS join message, the processor 200 moves to step S403. Otherwise, the processor 200 moves to step S450 of the FIG. 5b.

The MBMS join message comprises an identifier of the requested MBMS service and an SFN offset report.

The SFN offset report comprises the time offsets measured between the reference time signal received from the base station 10 which serves the mobile terminal 20 and the reference time signal transmitted by each neighbour base station 10. The SFN offsets report is determined by the mobile terminal 20.

At step S403, the processor 200 stores the SFN offsets report in the RAM memory 203.

At next step S404, the processor 200 checks if the requested MBMS service is already active, i.e. if the corresponding multimedia content is transferred in the cell 15 of the base station 10.

If the requested MBMS service is already active in the cell 15 of the base station 10, the processor 200 moves to step S413.

If the requested MBMS service is not active in the cell 15 of the base station 10, the processor 200 moves to step S405.

At step S405, the processor 200 sets a variable named main counter to the value one and a variable named neighbour counter to the value zero. The variable main counter is representative of the number of mobile terminals 20 which are served by the base station 10 and which receive the multimedia content corresponding to the MBMS service delivered by the base station 10.

It has to be noted here that a mobile terminal 20 receives the multimedia content if it has the necessary information enabling the decoding of the multimedia content. These necessary information can be, preferably and in a non limitative way, restricted to mobile terminals 20 which are clients to the MBMS service.

The variable neighbour counter is representative of the neighbour base stations 10 which manage cells 15 in which at least one mobile terminal 20 is served and receives the multimedia content associated to the corresponding MBMS service.

At next step S406, the processor 200 determines the multicast group address corresponding to the MBMS service identifier indicated in the received message.

In a realisation mode of the invention, such mapping is known in advance by the base station 10, and the processor 200 simply reads the multicast address in the memory 202 or 203.

In another realisation mode of the invention, the mapping is unknown, and the processor 200 commands the transfer through the network interface 206, of a multicast group request message to the aGW, comprising the MBMS service identifier indicated in the received message, and waits for a response from aGW indicating the corresponding multicast address.

At next step S407, the processor 200 commands the transfer, through the network interface 206, of a join multicast group message to the telecommunication network 30 with the multicast address determined at step S406.

At next step S408, the processor 200 allocates the radio resources which correspond to the requested MBMS service. The processor 200 setups the wireless interface 205 and the network interface 206 and decides on which frequency/time slot/code it should operate according to the quality of service parameters to provide to the mobile terminal 20. For instance, the base station 10 decides on which frequency/time slot/code it should operate, which can noticeably depend on the quality of service parameters, such as the average peak rate, to provide to the mobile terminal 20.

At next step S409, the processor 200 selects and stores the appropriate CFN-SFN offset with respect to its own time reference SFN. As the MBMS packet are CFN marked by UPE, the processor 200 might see its current SFN at the time of receiving a packet marked CFN, and decides to add some pre-configured delay for transmission over the wireless interface 205.

At next step S410, the processor 200 commands the transmission of the MBMS packets with the determined CFN-SFN offset.

At next step S411, the processor 200 computes, for each neighbour base station 10, information which enable the synchronisation of the base stations 10. The information is preferably equal to the sum of the CFN-SFN selected at step S409 and the SFN offset of that neighbour base station 10 comprised in the SFN offsets report.

At next step S412, the processor 200 commands the transfer, through the network interface 206, of a MBMS join notification message to each of its neighbour base stations 10. Each MBMS join message notification comprises, the sum determined at step S411 which corresponds to the base station 10 the message is sent, the multicast address received at step S407, information describing the radio resources which correspond to the requested MBMS service allocated at step S408 and an identifier of the requested MBMS service.

After that, the processor 200 returns to step S400.

If the processor 200 determines at step S404 that the requested MBMS service is already active in the cell 15 of the base station 10, the processor 200 moves to step S413.

At step S413, the processor 200 checks if the variable main counter is equal to null value. If the variable main counter is not equal to null value, the processor 200 moves to step S416, otherwise the processor 200 moves to step S414.

At step S414, the processor 200 computes, for each neighbour base station 10, information which enable the synchronisation of the base stations 10 on the same way as it is disclosed at step S411.

At next step S415, the processor 200 commands the transfer, through the network interface 206, of a MBMS join notification message to each of its neighbour base stations 10 on the same way as it is disclosed at step S412.

At next step S416, the processor 200 increments the variable main counter of one unit.

After that, the processor 200 returns to step S400.

Figure 5A:
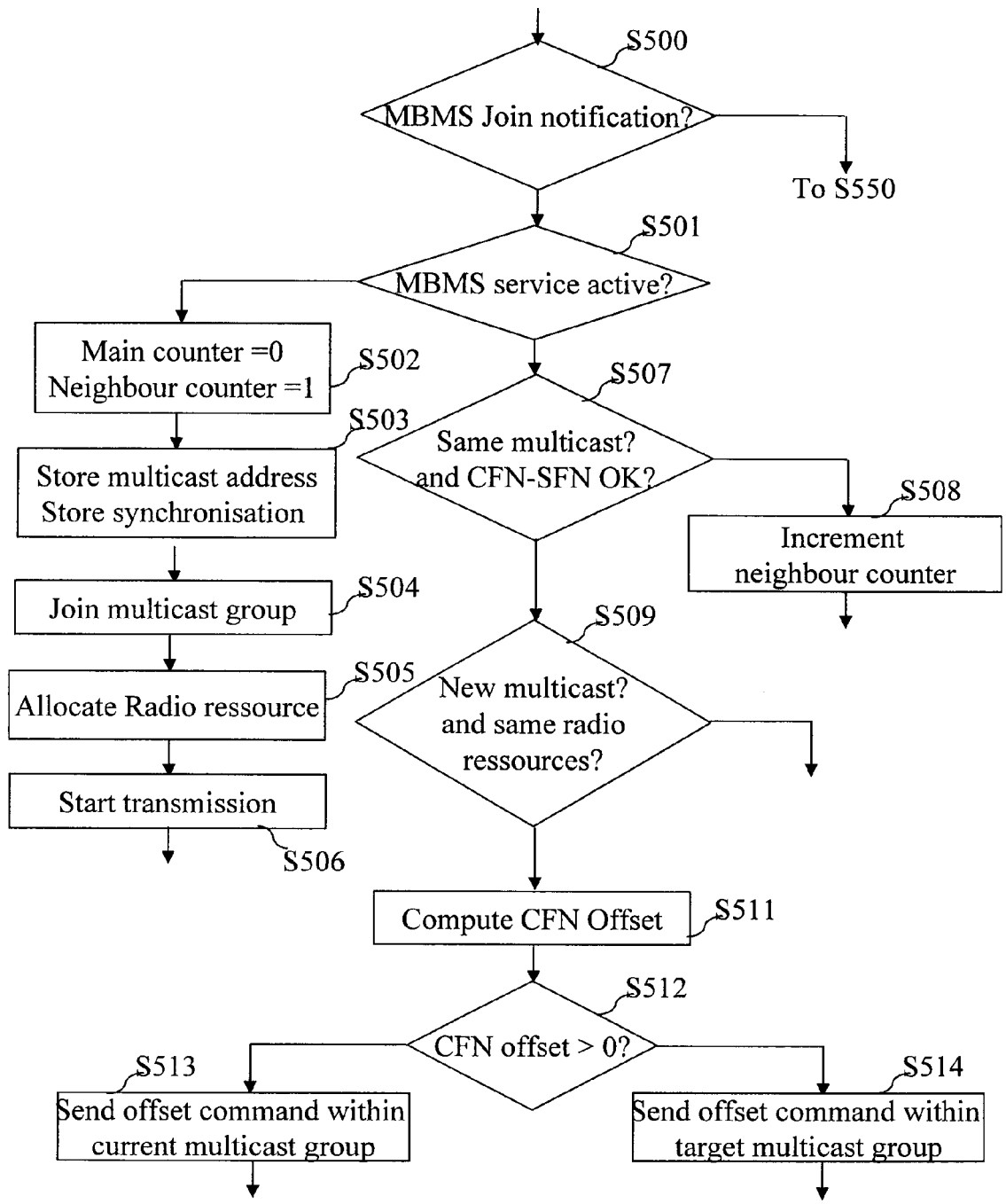
FIGS. 5a, 5b and 5c represent an algorithm executed by a base station when the base station receives a message from a neighbour base station.
Figure 5B:
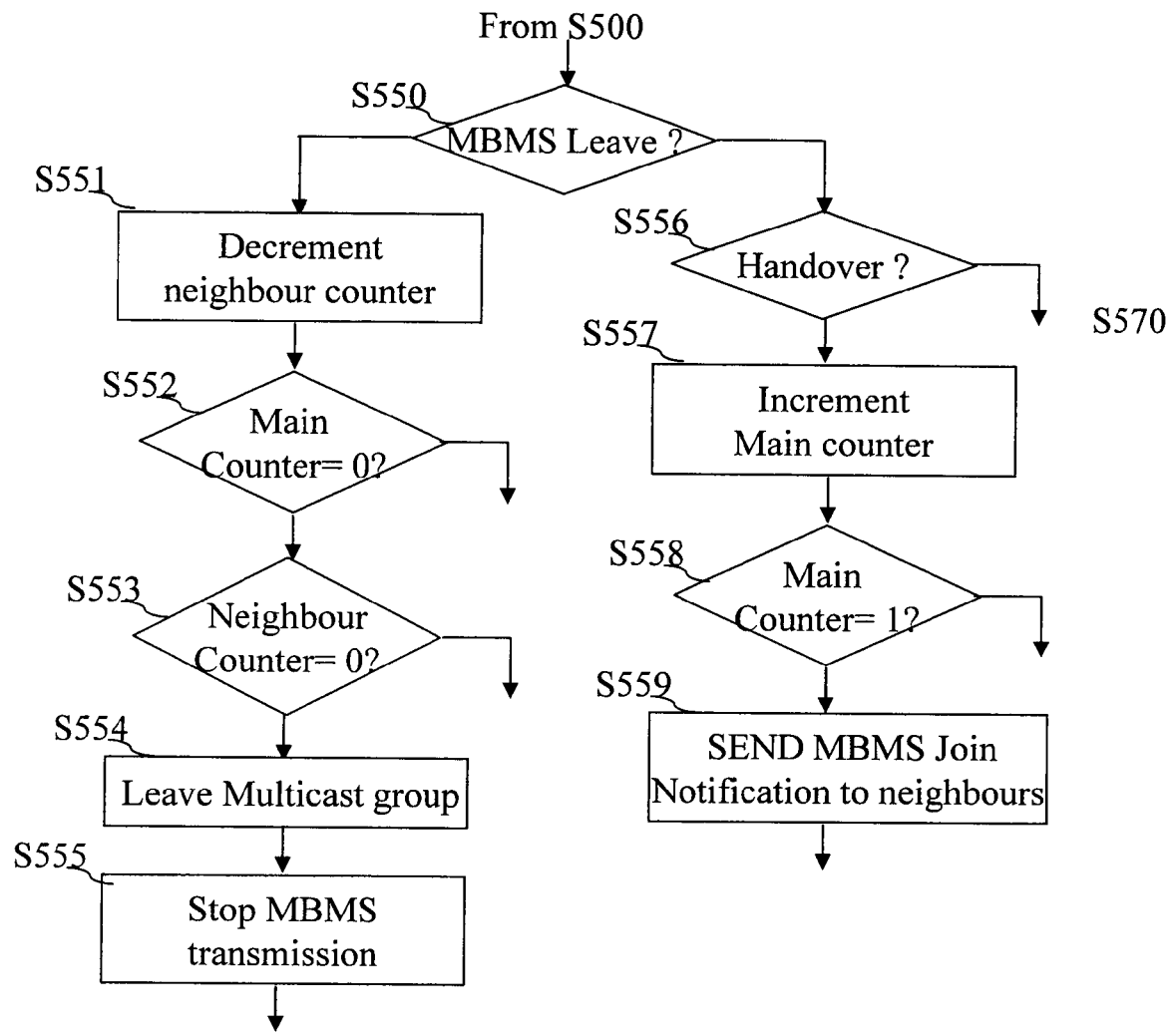

If the processor 200 determines at step S402 that the message received at step S400 is not a MBMS join message, the processor 200 moves to step S450 of the FIG. 5b.

At step S450, the processor 200 checks if the message is a MBMS leave message. If the message is a MBMS leave message, the processor 200 moves to step S451. Otherwise, the processor 200 moves to step S457.

At step S451, the processor 200 decrements the variable main counter, associated to the MBMS service identifier comprised in the received message, of one unit.

At next step S452, the processor 200 checks if the variable main counter is equal to null value.

If the variable main counter is equal to null value, the processor 200 moves to step S453, otherwise the processor 200 returns to step S400.

At step S453, the processor 200 commands the transfer, through the network interface 206, of a MBMS leave notification message to each of its neighbour base stations 10.

At next step S454, the processor 200 checks if the variable neighbour counter is equal to null value.

If the variable neighbour counter is equal to null value, the processor 200 moves to step S455, otherwise the processor 200 returns to step S400.

At step S455, the processor 200 commands the transfer, through the network interface 206, of a leave multicast group message to the telecommunication network 30.

At next step S456, the base station 10 stops the transmission in the cell 15 of the base station 10 of the multimedia content which corresponds to the MBMS service identifier comprised in the received message.

The processor 200 returns then to step S400 of the FIG. 4a.

If at step S450, the processor 200 determines that the message is not a MBMS leave message, the processor 200 moves to step S457.

At step S457, the processor 200 checks if the message received at step S400 is a handover message.

If the message received at step S400 is a handover message, the processor 200 moves to step S458, otherwise the processor 200 returns to step S400.

It has to be noted here that the handover message comprises the identifier of the base station 10, the mobile terminal 20 expects to be served by.

At next step S458, the processor 200 commands the transfer, through the network interface 206, of a handover notification message to the base station 10, the mobile terminal 20 expects to be served by.

At step S459, the processor 200 decrements the variable main counter of one unit.

At next step S460, the processor 200 checks if the variable main counter is equal to null value.

If the variable main counter is equal to null value, the processor 200 moves to step S461, otherwise the processor 200 returns to step S400.

At step S461, the processor 200 commands the transfer, through the network interface 206, of a MBMS leave notification message to each of the base stations 10 which manage a cell 15 which is neighbour from the cell 15 it manages.

After that, the processor 200 returns to step S400.

Figure 5C:
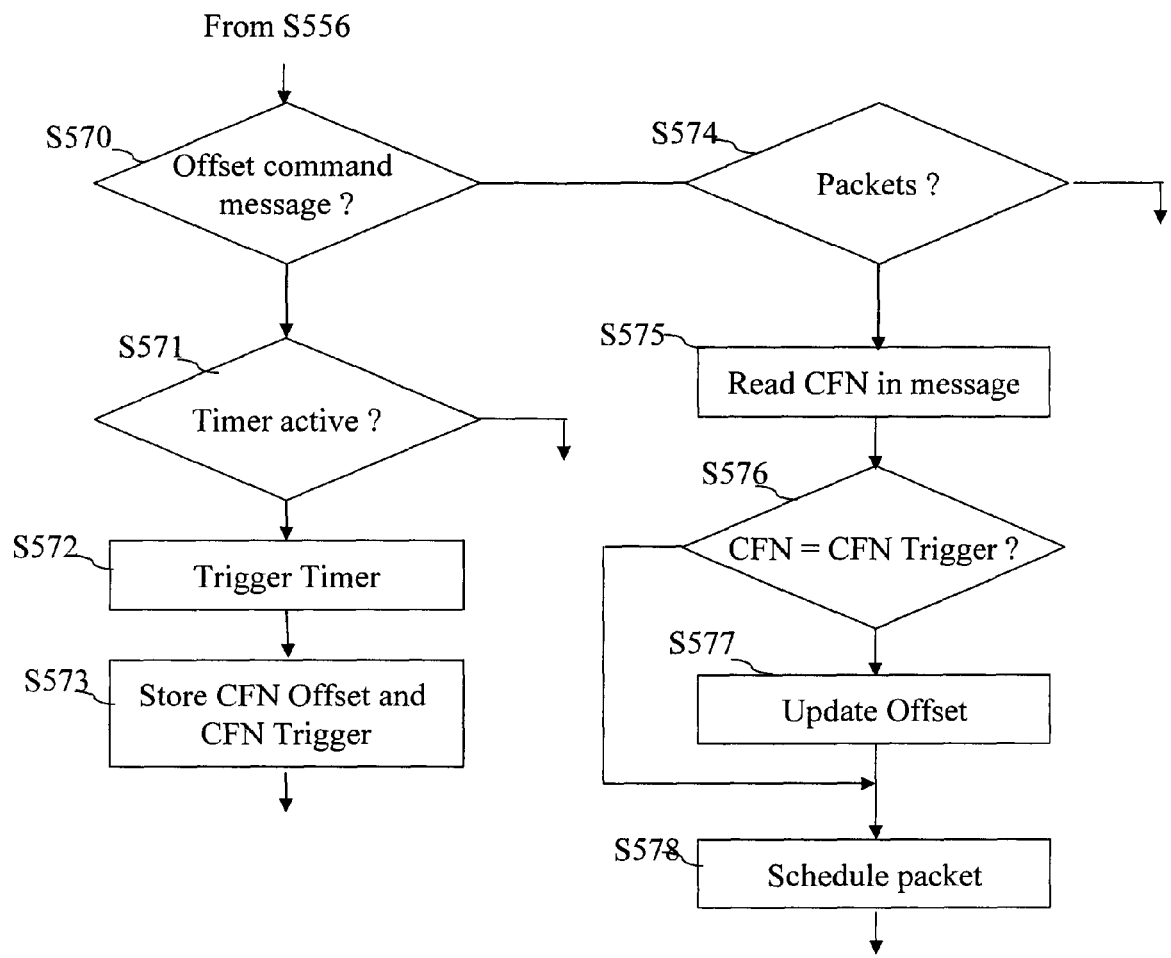

FIGS. 5a, 5b and 5c represent an algorithm executed by a base station when the base station receives a message from a neighbour base station.

More precisely, the present algorithm is executed by the processor 200 of each base station 10.

At step S500, the processor 200 checks if the message received at step S400 is a MBMS join notification message.

If the message is a MBMS join notification message as the one disclosed at step S412 or S415 of the FIG. 4a, the processor 200 moves to step S501.

If the message is not a MBMS join notification message, the processor 200 moves to step S550 of the FIG. 5b.

At next step S501, the processor 200 checks if the requested MBMS service is already active, i.e. if multimedia content is being transferred in the cell 15 of the base station 10 for the MBMS service identifier indicated in the received message.

If the requested MBMS service is already active in the cell 15 of the base station 10, the processor 200 moves to step S507.

If the requested MBMS service is not active in the cell 15 of the base station 10, the processor 200 moves to step S502.

At step S502, the processor 200 sets the variable main counter, corresponding to the MBMS service identified in the received message, to the null value and the variable neighbour counter corresponding to the MBMS service identifier indicated in the received message, to the value one.

At next step S503, the processor 200 memorizes, in the RAM memory 203, the multicast address, information describing the radio resources which correspond to the requested MBMS service and information which enable the synchronisation of the base stations 10 which are comprised in the received message.

At next step S504, the processor 200 commands the transfer through the network interface 206 a join multicast group message to the telecommunication network 30, with the multicast address memorised at step S503.

At next step S505, the processor 200 allocates the radio resources which correspond to the requested MBMS service using the information describing the radio resources which correspond to the requested MBMS service stored at step S503.

The processor 200 sets up the wireless interface 205 and the network interface 206.

At next step S506, the processor 200 commands the transmission of the multimedia content according to the data which enable the synchronisation of the base stations 10.

After that, the processor 200 returns to step S400.

If the requested MBMS service is not active in the cell 15 of the base station 10, the processor 200 moves from step S501 to step S507.

At step S507, the processor 200 checks if the multicast address of the requested MBMS service comprised in the MBMS join notification message is identical to the multicast address of the MBMS service which is currently active and if the data which enable the synchronisation of the base stations 10 comprised in the received message is correct.

If the multicast address of the requested MBMS service comprised in the MBMS join notification message is identical to the multicast address of the MBMS service which is currently active and if the data which enable the synchronisation of the base stations 10 comprised in the received message is correct, the processor 200 moves to step S508.

At step S508, the processor 200 increments the variable neighbour counter of one unit.

After that, the processor 200 returns to step S400.

If the multicast address of the requested MBMS service comprised in the MBMS join notification message is not identical to the multicast address of the MBMS service which is currently active or if the data which enable the synchronisation of the base stations 10 comprised in the received message is not correct, the processor 200 moves to step S509.

A data enabling the synchronisation of the base stations 10 is not correct when it is different from the CFN-SFN value used currently for the active MBMS service.

At step S509, the processor 200 checks if the multicast address of the requested MBMS service comprised in the MBMS join notification message is different from the multicast address of the MBMS service which is currently active and if the information describing the radio resources which correspond to the requested MBMS service are equal to the one currently allocated by the base station 10 for the MBMS service which is currently active.

If the multicast address of the requested MBMS service comprised in the MBMS join notification message is different from the multicast address of the MBMS service which is currently active and if the information describing the radio resources which correspond to the requested MBMS service are equal to the one currently allocated by the base station 10 for the MBMS service which is currently active, the processor 200 moves to step S511.

If the multicast address of the requested MBMS service comprised in the MBMS join notification message is identical to the multicast address of the MBMS service which is currently active or if the information describing the radio resources which correspond to the requested MBMS service are equal to the one currently allocated by the base station 10 for the MBMS service which is currently active, the processor 200 returns to step S400.

In a variant implementation, the processor 200 commands the stop of the MBMS service in the cell 15 of base station 10, prior to moving to step S400.

At step S511, the processor 200 computes a CFN offset. The CFN offset is equal to the difference between the CFN-SFN value currently being used for the MBMS service which is currently active and the data enabling the synchronisation of the base stations 10 comprised in the received message.

At step S512, the processor 200 checks if the computed CFN offset value is positive.

If the CFN offset value is positive, the processor 200 moves to step S513, if the CFN offset value is negative, the processor 200 moves to step S514.

In a variant implementation of the invention, if the CFN offset value is positive, the processor 200 moves to step S514, if the CFN offset value is negative, the processor 200 moves to step S513.

At step S513, the processor 200 commands the transfer, through the network interface 206, of an offset command message to the base stations 10 which belong to the same multicast group of the MBMS service as the one of the base station 10 which received the message. The offset command message comprises the multicast address, information describing the radio resources, which correspond to the requested MBMS service contained in the received message, a CFN trigger which indicates the moment the offset command should be applied by the base stations 10 which received the message and the CFN offset determined at step S511.

After that, the processor 200 returns to step S400.

At step S514, the processor 200 commands the transfer, through the network interface 206, of an offset command message to the base stations 10 which belong to the same multicast group of the MBMS service as the one of the base station 10 which sent the received message. The offset command message comprises the multicast address, information describing the radio resources, which correspond to the requested MBMS service, allocated at step S408 or S505, a CFN trigger which indicates the moment the offset command should be applied by the base stations 10 which received the message and the CFN offset determined at step S511.

After that, the processor 200 returns to step S400.

It has to be noted here that the offset command message is in a variant transferred through the aGW.

If the processor 200 determines at step S500 that the message is not a MBMS join notification message, the processor 200 moves to step S550 of the FIG. 5b.

At step S550, the processor 200 checks if the message is a MBMS leave notification message. If the message is a MBMS leave notification message, the processor 200 moves to step S551. Otherwise, the processor 200 moves to step S556.

At step S551, the processor 200 decrements the variable neighbour counter, corresponding to the MBMS service indicated in the received message, of one unit.

At next step S552, the processor 200 checks if the variable main counter corresponding to the MBMS service indicated in the received message, is equal to null value.

If the variable main counter corresponding to the MBMS service indicated in the received message, is equal to null value, the processor 200 moves to step S553, otherwise the processor 200 returns to step S400.

At next step S553, the processor 200 checks if the variable neighbour counter corresponding to the MBMS service indicated in the received message, is equal to null value.

If the variable neighbour counter corresponding to the MBMS service indicated in the received message, is equal to null value, the processor 200 moves to step S554, otherwise the processor 200 returns to step S400.

At step S554, the processor 200 commands the transfer, through the network interface 206, of a leave multicast group message to the telecommunication network 30, with the multicast group address stored in memory at step S406 or S503 for the MBMS service indicated in the received message.

At next step S555, the transmission of the multimedia content associated to the MBMS service in the cell 15 of the base station 10 is stopped.

The processor 200 returns then to step S400 of the FIG. 4a.

If at step S550, the processor 200 determines that the message is not a MBMS leave notification message, the processor 200 moves to step S556.

At step S556, the processor 200 checks if the message received at step S400 is a handover message.

If the message received at step S400 is a handover message, the processor 200 moves to step S557, otherwise the processor 200 moves to step S570.

At step S557, the processor 200 increments the variable main counter corresponding to the MBMS service indicated in the received message, of one unit.

At next step S558, the processor 200 checks if the variable main counter corresponding to the MBMS service indicated in the received message, is equal to the value one.

If the variable main counter corresponding to the MBMS service indicated in the received message, is equal to the value one, the processor 200 moves to step S559, otherwise the processor 200 returns to step S400.

At step S559, the processor 200 commands the transfer, through the network interface 206, of a MBMS join notification message to each of its neighbour base stations 10. The MBMS join notification message is as the one transferred at step S412 of the FIG. 4a.

After that, the processor 200 returns to step S400.

At step S570 of the FIG. 5c, the processor 200 checks if the received message is an offset command message.

If the received message is an offset command message, the processor 200 moves to step S571.

At step S571, the processor 200 checks if a timer is active for the MBMS service indicated in the received message. If a timer is active, the processor 200 returns to step S400. If a timer is not active, the processor 200 moves to step S572.

At step S572, the processor 200 activates a timer for the MBMS service indicated in the received message and moves to step S573. The timer is activated for a predetermined duration.

At next step S573, the processor 200 stores the information describing the radio resources, which correspond to the requested MBMS service, CFN offset and the CFN trigger comprised in the received offset command message in the memory 203.

If, at step S570, the processor 200 checked that the received message is not an offset command message, the processor 200 moves to next step S574.

The steps S571 to S573 avoid that offset command messages transferred by different base stations 10 concerning the same command are processed by the processor 200.

Such case occurs when a mobile terminal 20 enters in the cell 15 managed by a base station 10 which does not transfer yet a multimedia content and where at least two neighbour base stations 10 which belong to a multicast group transfer already the multimedia content. The base station 10 which does not transfer yet a multimedia content gets a multicast address which may be different from the one of the neighbour base stations 10 and transfer to the neighbour base stations 10 a join notification message. In such case each neighbour base station 10 transfers, in response, an offset command message to the base station 10.

At step S574, the processor 200 checks if the received message comprises packets of the multimedia content.

If the received message comprises packets of the multimedia content, the processor 200 moves to step 575. Else, the processor 200 returns to step S400.

At step S575, the processor 200 read the CFN timestamps comprised in the packets of the multimedia content. Each CFN timestamp is marked originally by the sending UPE.

At next step S576, the processor 200 checks if the CFN timestamps comprised in the packets of the multimedia content equals the CFN trigger value memorised at step S573.

if one CFN timestamp comprised in a packet of the multimedia content equals the CFN trigger contained in memory, the processor 200 moves to step S577. Else, the processor 200 moves to step S578.

At step S577, the processor 200 adds to the CFN-SFN offset determined at step S409 or received at step S503, the CFN offset value stored in memory at step S573. The newly determined value is memorised in place of CFN-SFN value determined at step S409 or received at step S503. The processor 200 also reconfigures the radio resources for the requested MBMS service according to the information describing the radio resources, which correspond to the requested MBMS service stored at step S573.

At next step S578, the processor 200 schedules the transmission of the payload included in the packets of the multimedia content at a timing respecting the CFN-SFN difference determined at step S577.

Referring to the example of the FIG. 3. The mobile terminal 20a sends a MBMS join message to the base station 10. The MBMS join message comprises the identifier of the requested MBMS service and an SFN offset report. The base station 10a executes the steps S403 to S412 of the FIG. 4a. The base station 10a activates the MBMS service and starts the transmission of the corresponding multimedia content in the cell 15a. The base station 10a sends a MBMS join notification to the neighbours base stations 10e, 10b and 10f. The base stations 10e, 10b, 15f execute the steps S502 to S506 of the FIG. 5a and activates the MBMS service and starts the transmission of the corresponding multimedia content in their respective cell 15e, 15b and 15f.

The mobile terminal 20b sends a MBMS join message to the base station 10d. The MBMS join message comprises the identifier of the requested MBMS service and an SFN offset report. The identifier of the requested MBMS service is as example equal to the one transferred by the mobile terminal 20a. The base station 10d executes the steps S403 to S412 of the FIG. 4a The base station 10d activates the MBMS service and starts the transmission of the corresponding multimedia content in the cell 15d. The base station 10d sends a MBMS join notification to the neighbours base stations 10c, 10i, 10k, 10l, 10m and 15m. The base stations 10c, 10i, 10k, 10l, 10m and 15m execute the steps S502 to S506 and activates the MBMS service and starts the transmission of the corresponding multimedia content in their respective cell 15e, 15b and 15f.

Preferably, the base stations 10a, 10e, 10b and 10f belong to the same multicast group which is different from the multicast group the base stations 10d, 10c, 10i, 10k, 10l, 15m and 10j.

When the mobile terminal 20a moves to cell 15b, a handover is executed.

The mobile terminal 20a sends a handover message to the base station 10a. The base station 10a executes the steps S457 to S460 of the FIG. 4b, sends a handover notification message to the base station 10b and sends after, a MBMS leave notification message to the base stations 10e, 10b and 10f.

At the reception of the a handover notification message, the base stations 10b executes the steps S556 to S559 and sends a MBMS join notification to the neighbours base stations 10a, 10e, 10g, 10c, 10h and 10f.

At the reception of the MBMS join notification message, the base stations 10a, 10e and 10f execute the steps S501, S507 and S508 and increment their respective neighbour counter.

At the reception of the MBMS leave notification message, the base station 10e and 10f execute the steps S551, decrement their respective neighbour counter and as the value of their respective neighbour counter is not null, the base stations 10e and 10f continue the transmission of the multimedia content associated to the MBMS service in the cell 15e and 15f.

At the reception of the MBMS leave notification message, the base station 10b decrements its neighbour counter, and as the value of the main counter is not null, the base station 10b continue the transmission of the multimedia content associated to the MBMS service in the cell 15b.

At the reception of the MBMS join notification message, the base stations 10g and 10h execute the steps S502 to S506 of the FIG. 5a and activate the MBMS service and starts the transmission of the corresponding multimedia content in their respective cell 15g, 15c and 15h.

As the base station 10c belongs to a different multicast group as the one of the base station 10b, the multicast address of the requested MBMS service comprised in the MBMS join notification message is different from the multicast address of the MBMS service which is currently active in the cell 15c, the base station 10c moves from step S509 to S511 and computes a CFN offset. The CFN offset is equal to the difference between the CFN-SFN value currently being used for the MBMS service which is currently active in the cell 15c and the data enabling the synchronisation of the base stations 10 comprised in the received message.

At step S512, the base station 10c checks if the computed CFN offset value is positive.

If the CFN offset value is positive, the base station 10c commands the transfer, through the network interface 206, of an offset command message to the base stations 10 which belong to the same multicast group as the one of the base station 10 which sent the received message, i.e. the base stations 10a, 10b, 10e, 10g, 10h and 10f.

The offset command message comprises the multicast address, a CFN trigger which indicates the moment the offset command should be applied by the base stations 10 which received the message and the CFN offset determined at step S511.

The base stations 10a, 10b, 10e, 10g, 10h and 10f receive the offset command message and execute the steps S570 to S573 of the algorithm of the FIG. 5c.

When the base stations 10a, 10b, 10e, 10g, 10h and 10f receive a message comprising packets of the multimedia content, the base stations 10a, 10b, 10e, 10g, 10h and 10f execute the steps S574 to S578 of the FIG. 5c.

The base stations 10a, 10b, 10e, 10g, 10h and 10f read the CFN timestamps comprised in the packets of the multimedia content, wait that the CFN timestamps comprised in the packets of the multimedia content equals the received CFN trigger value, add to the CFN-SFN offset determined at step S409 or received at step S503, the CFN offset value and schedule the transmission of the payload included in the packets of the multimedia content at a timing respecting the determined CFN-SFN difference.

When the mobile terminal 20a moves to cell 15c, a handover is executed.

The mobile terminal 20a sends a handover message to the base station 10b. The base station 10b executes the steps S457 to S460 of the FIG. 4b, sends an handover notification message to the base station 10c and sends after, a MBMS leave notification message to the base stations 10a, 10e, 10f, 10g, and 10h.

The base stations 10e and 15f execute the step S551, decrement their respective neighbour counter, and as the values of their respective main counter and neighbour counter are null, the base stations leave the multicast group and stop the transmission of the multimedia content associated to the MBMS service in the cells 15e and 15f they respectively manage.

The present invention allows then the deployment of MBMS services in a wireless cellular telecommunication network by efficiently using the only needed resources of the wireless cellular telecommunication network. According to the invention, the MBMS service is activated in plural discontinuous areas composed of a reduced number of cells 15. When a MBMS service starts, few mobile terminals 20 have some interest for that service. The present invention enables the availability of the MBMS service in as many areas as needed. When the number of mobile terminals 20 which have some interest for that service increases, the areas can synchronise each other when they intersect each other.

Naturally, many modifications can be made to the embodiments of the invention described above without departing from the scope of the present invention.

The invention claimed is:

1. Method for setting up the transfer of a multimedia content in a cell of a wireless cellular telecommunication network constituted of plural cells, the cells being neighbour of at least one other cell, each cell being managed by a base station, characterised in that the method comprises the steps executed by a first base station which manages a first cell of:
receiving from a mobile terminal served by the first base station a message informing that the mobile terminal expects to receive the multimedia content in the first cell,
transferring a message to at least a second base station which manages a second cell which is neighbour from the first cell, the message notifying that the first base station transfers the multimedia content in the first cell and the message comprising at least information identifying the multimedia content,
transferring the multimedia content in the first cell,
monitoring the number of mobile terminals which receive the multimedia content in the first cell,
transferring a message to at least the second base station notifying that no mobile terminal receives the multimedia content in the first cell if no mobile terminal receives the multimedia content in the first cell.

2. Method according to claim 1, characterised in that the method comprises further steps of:
receiving from a third base station which manages a third cell which is neighbour of the first cell managed by the first base station, a message notifying that the third base station transfers the multimedia content in the third cell, the message comprising at least information identifying the multimedia content,
obtaining the multimedia content from the wireless cellular telecommunication network,
transferring the multimedia content in the first cell.

3. Method according to claim 2, characterised in that the method comprises further steps of:
monitoring the number of base stations which manage neighbouring cells of the first cell and which transfer the multimedia content in the cell they respectively manage,
stopping to transfer the multimedia content in the first cell if no base stations which manage neighbouring cells of the first cell transfer the multimedia content in the cell they respectively manage and if no mobile terminal receive the multimedia content in the first cell,
transferring a message to at least the second base station notifying that the first base station stops to transfer the multimedia content in the first cell.

4. Method according to claim 3, characterised in that the base stations transfer predetermined signal in the cell the base stations respectively manages, the mobile terminals transfer a report of the differences on reception time of the predetermined signals to the base stations.

5. Method according to the claim 4, characterised in that the multimedia content is transferred under the form of time stamped packets and in that the method comprises the steps of:
receiving from the third base station information enabling the synchronisation of the transmission of the multimedia content by the first base station with the transmission of the multimedia content by the second base station,
transferring the packets in the first cell according to the information enabling the synchronisation of the transmission of the multimedia content by the first base station with the transmission of the multimedia content by the third base station.

6. Method according to claim 5, characterised in that the method comprises further steps of:
receiving from the third base station information describing the radio resources which correspond to the multimedia content,
allocating the radio resources according to the information describing the radio resources.

7. Method according to claim 2, characterised in that the message notifying that the third base station transfers the multimedia content in the third cell further comprises a multicast address used by the third base station for receiving the multimedia content and in that method comprises further step, executed once the message notifying that the third base station transfers the multimedia content in the third cell is received, of:
checking if the multimedia content is transferred in the first cell, and if the multimedia content is transferred in the first cell:
checking if the multicast address comprised in the message notifying that the third base station transfers the multimedia content in the third cell is different from a multicast address used by the first base station for receiving the multimedia content,
transferring a message to the other base stations which use the same multicast address used by the first base station for receiving the multimedia content or to the base stations which use the same multicast address used by the third base station for receiving the multimedia content.

8. Method according to claim 7, characterised in that the message notifying that the third base station transfers the multimedia content in the third cell further comprises information enabling the synchronisation of the first base station and in that the message transferred to the other base stations which use the same multicast address used by the first base station or to the base stations which use the same multicast address used by the third base station comprises an information representative or a time delay to be applied on the packets of the multimedia content transferred in the cells.

9. Method according to claim 8, characterised in that the multimedia content is transferred under the form of time stamped packets and the message transferred to the other base stations which use the same multicast address used by the first base station for receiving the multimedia content or to the base stations which use the same multicast address used by the third base station for receiving the multimedia content further comprises an information indicating the value of a timestamp from which the time delay has to be applied on the packets of the multimedia content transferred in the cells.

10. Device for setting up the transfer of a multimedia content in a cell of a wireless cellular telecommunication network constituted of plural cells, the cells being neighbour of at least one other cell, each cell being managed by a base station, characterised in that the device for enabling the transfer of the multimedia content is included in a first base station which manages a first cell and comprises:

means for receiving from a motile terminal served by the first base station a message informing that the mobile terminal expects to receive the multimedia content in the first cell, means for transferring a message to at least a second base station which manages a second cell which is neighbour from the first cell, the message notifying that the first base station transfers the multimedia content in the first cell and the message comprising at least information identifying the multimedia content, means for transferring the multimedia content in the first cell, monitoring the number of mobile terminals which receive the multimedia content in the first cell, means for transferring a message to at least the second base station notifying that no mobile terminal receives the multimedia content in the first cell if no mobile terminal receives the multimedia content in the first cell.

11. A non-transitory computer readable memory storing program instructions which when executed by a programmable device resulting in implementing the method according to claim 1.

\* \* \* \* \*